(12) United States Patent
Yu et al.

(10) Patent No.: US 6,654,103 B2
(45) Date of Patent: Nov. 25, 2003

(54) COMPENSATION AND CONTROL OF BOTH FIRST-ORDER AND HIGHER-ORDER POLARIZATION-MODE DISPERSION

(75) Inventors: Qian Yu, Los Angeles, CA (US); Lianshan Yan, Los Angeles, CA (US); Sanggeon Lee, Union City, CA (US); Alan E. Willner, Los Angeles, CA (US)

(73) Assignee: University of Southern California, Los Angeles, CA (US)

(*) Notice: Subject to any disclaimer, the term of this patent is extended or adjusted under 35 U.S.C. 154(b) by 107 days.

(21) Appl. No.: 09/946,788

(22) Filed: Sep. 4, 2001

(65) Prior Publication Data

US 2002/0075477 A1 Jun. 20, 2002

Related U.S. Application Data

(60) Provisional application No. 60/229,953, filed on Sep. 1, 2000.

(51) Int. Cl.[7] .............................................. G01N 21/00
(52) U.S. Cl. .................................................... 356/73.1
(58) Field of Search ..................... 356/73.1; 385/11–28, 385/123; 359/140, 156, 153

(56) References Cited

U.S. PATENT DOCUMENTS 5,930,414 A * 7/1999 Fishman et al. .............. 385/11

FOREIGN PATENT DOCUMENTS

| DE | 198 18 699 | 10/1999 |
| EP | 0 909 045 | 4/1999 |
| EP | 0 964 237 | 12/1999 |
| WO | WO99/31537 | 6/1999 |

OTHER PUBLICATIONS

Kudou, T. et al. "Theoretical basis of polarization mode dispersion equalization up to the second order." Journal of Lightwave technology, IEEE 18(4):614–617 (2000).

Hok Yong Pua et al. "An adaptive first–order polarization–mode dispersion compensation system aided by polarization scrambling: theory and demonstration." Journal of Lightwave Technology, IEEE 18(6):832–841 (2000).

Pan, Z. et al. "Chirp–free tunable PMD compensation using hi–Bi nonlinearly–chirped FBGs in a dual–pass configuration." Optical Fiber Communication conference. Technical Digest Postconference Edition. Trends in Optics and Photonics 37(3):113–115 (2000).

Sobiski, D. et al. "Fast first–order PMD compensation with low insertion loss for 10Gbit/s system." Electronics Letters 37(1):46–48 (2001).

R. Noe, et al., *Integrated Optical LiNbO3 Distributed Polarization Mode Dispersion Compensator in 20 Gbit/s Transmission System*, Electronics Letters, Apr. 15th 1999, vol. 35, No. 8, pp. 652–654.

Fred Heismann, *Analysis of a Reset–Free Polarization Controller for Automatic Polarization Stabilization in Fiber–optic Transmission Systems*, Journal of Lightwave Technology, Apr. 1994, vol. 12, No. 4, pp. 690–699.

Mark Shtaif, et al., *A Compensator for the Effects of High–Order Polarization Mode Dispersion in Optical Fibers*, IEEE Photonics Technology Letters, Apr. 2000, vol. 12, No. 4, pp. 433–436.

* cited by examiner

Primary Examiner—Tu T. Nguyen
(74) Attorney, Agent, or Firm—Fish & Richardson P. C.

(57) ABSTRACT

Techniques and devices for controlling or compensating for both the first-order and high-order PMD effects in an optical signal by processing the signal in a fixed DGD stage and a variable DGD stage in sequence.

23 Claims, 4 Drawing Sheets

COMPENSATION AND CONTROL OF BOTH FIRST-ORDER AND HIGHER-ORDER POLARIZATION-MODE DISPERSION

This application claims the benefit of U.S. Provisional Application Ser. No. 60/229,953 filed Sep. 1, 2000.

This invention was made with government support under Contract No. F30602-98-1-0196 awarded by the United States Air Force. The government has certain rights in the invention.

BACKGROUND

This application relates to compensation for and control of optical dispersion, and more specifically, to techniques for reducing polarization-mode dispersion in optical media such as optical fibers used in various fiber systems including optical wavelength-division multiplexing (WDM) fiber systems.

Some optical transmission media, e.g., optical fibers, may be optically birefringent and hence exhibit different refractive indices for light with different polarizations along two orthogonal principal directions. Therefore, an optical signal, comprising of two components along the two orthogonal principal directions for each frequency, can be distorted after propagation through the transmission medium because the two components propagate at different group velocities. One effect of such dispersion-induced distortion is broadening of optical pulses. This polarization-dependent optical dispersion is generally referred to as the first-order polarization-mode dispersion ("PMD"). The degree of the first-order PMD may be approximately characterized by the average differential group delay ("DGD") between two orthogonal principal states of polarization. PMD also exhibits higher order effects and further complicates the compensation and management of the PMD in fiber systems.

Typical causes for such birefringence in fibers include, among others, imperfect circular core and unbalanced stress in a fiber along different transverse directions. Notably, the direction of one axis of birefringence of the optical fiber may change randomly on a time scale that varies, e.g., from milliseconds to hours, depending on the external conditions. Thus, the DGD in an actual PMD fiber is not a fixed value but a random variable. In many fiber links in communication systems, the PMD-induced DGD has a Maxwellian probability density function.

Such polarization-mode dispersion is undesirable in part because the pulse broadening can limit the transmission bit rate, the transmission bandwidth, and other performance factors of an optical communication system. In fact, PMD is one of key limitations to the performance of some high-speed optical fiber communication systems at or above 10 Gbits/s per channel due to the fiber birefringence. It is desirable to control, manage, or compensate such optical dispersion in fiber systems.

SUMMARY

This disclosure includes techniques for controlling, managing, or compensating both first-order and higher-order PMD in a two-stage PMD control scheme. The first PMD control stage includes a fixed PMD element designed to produce a fixed DGD for controlling second-order and higher-order PMD in the input optical signal. The second PMD control stage includes a variable PMD element designed to produce a variable DGD for controlling the residual first-order PMD in the input signal after being processed by the first stage. An optical element is interconnected between the fixed PMD element and the variable PMD element to rotate the polarization of the output light from the first stage by a desired angle.

DETAILED DESCRIPTION

The techniques and devices of this disclosure are in part based on the recognition that both the first order and higher orders of the PMD in a fiber system need be compensated or managed. Many PMD compensators with different fixed DGD elements connected in series usually require complex feedback control loops that operate in connection with one another to simultaneously adjust a large number of control variables (e.g., 10 or more). Such compensators tend to be structurally complex and respond slowly.

Figure 1:
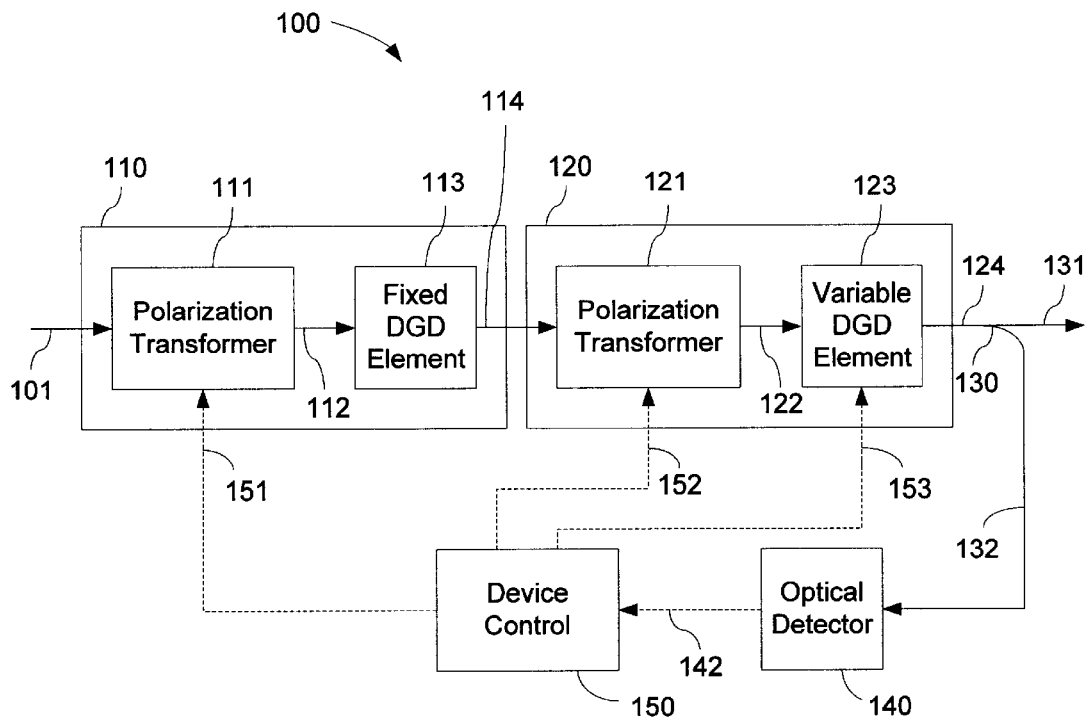
FIG. 1 shows one embodiment of a two-stage PMD control device.

FIG. 1 shows one embodiment of a two-stage PMD device 100 that can either operate as a PMD controller for controlling and managing the PMD in a fiber link or a PMD compensator for compensating PMD effects of the fiber link. The first stage 110 is designed to produce a fixed amount of DGD in the received optical signal 101 to produce a modified signal 114. This operation is used to control or compensate for the second and higher order PMD effects in the received signal 101. The second stage 120, optically connected to receive the modified signal 114, is designed to produce a variable DGD in the modified signal 114 to control the residual first-order PMD so that the PMD in the output signal 124 is at a desired state or substantially canceled. The operation of the second stage 120 doses not substantially change the PMD modification produced by the first stage. This two-stage design can control or compensate for both first-order and higher-order PMD effects and can reduce the number of control variables to as less as 5 to simplify the entire device structure and its control.

The first stage 110 includes a polarization transformer 111 to control the polarization of the input optical signal 101 and a fixed DGD element 113 to modify the DGD in the signal 101. The fixed DGD element 113 may include an optically-birefringent medium such as a polarization-maintaining fiber or a birefringent crystal to produce a fixed delay between two principal states of polarization at a given wavelength. This fixed amount of DGD is selected according to the desired amount of high-order PMD effects in the received signal 101. The polarization transformer 111 can be adjusted in response to a control signal 151 to rotate a polarization of the input signal 111 to produce a polarization-rotated signal 112 whose polarization is aligned with respect to a selected axis of the two principal axes of the element 113. A polarization controller with two or three degrees of freedom, for example, may be used as the polarization transformer 111.

The second stage 120 includes a variable DGD element 123 that responds to a control signal 153 to produce a variable DGD on the received signal 122. A polarization transformer 121 is included in the input of the element 123 to rotate the polarization of the modified signal 114 from the first stage 110 to a desired direction defined by the variable DGD element 123. This second stage 120 modifies the residual first-order PMD in the signal 114 to either control the residual first-order PMD in the signal 124 at a desired value or substantially cancel the residual first-order PMD.

The polarization of light may be represented by coordinates along two principal polarization axes that are orthogonal to each other. Hence, at least two degrees of freedom are needed to completely control the polarization. The total degrees of freedom of the two polarization transformers 111 and 121 may be equal to or greater than 4, to completely control the generally-arbitrary polarization of the input signal 101 received by the device 100. Because the variable DGD element 123 has a single degree of freedom, the device 100 has degrees of the freedom not less than 5. The minimum number of control variables is 5.

In principle, the two stages 110 and 120 may switch their positions to achieve control over the PMD state of the output beam 124 out of the device 100. However, when the stage 120 processes the input beam 101 first, the polarization of the output beam from the stage 120 may change significantly between 0 and $2\pi$ at a high speed due to the varying DGD produced by the PMD element 123. The stage 110, connected in the downstream of the stage 120 in this switched position, may not be able to respond to such rapid change in the light polarization due to the practical limitations of many commercial polarization controllers that may be used as the element 111. Hence, it may be preferred to place the stages 110 and 120 in the sequence as shown in FIG. 1.

In operation of the device 100, the polarization of the input light 101 is first rotated by the transformer 111 to align with a selected axis of the two principal axes of the fixed DGD element 113. A fixed DGD is then produced on the polarization-rotated light 112 to generate the signal 114. The polarization transformer 121 in the stage 120 rotates the polarization of the signal 114 to be aligned with a selected axis of the two principal axes of the variable DGD element 123. Next, the element 123 processes the polarization-rotated light 122 to produce a desired variable DGD thereon and generates the output signal 124. In the above operation, the stage 110 produces the fixed DGD on the input light 101. In comparison with the arrangement where the stage 120 is placed in front of the stage 110, this substantially reduces the amount of change in polarization of the signal 114 as the input polarization of the light 101 varies. Hence, the polarization transformer 121 may be implemented by many commercial polarization rotators or polarization controllers to follow the polarization change in the light 114.

Figure 2:
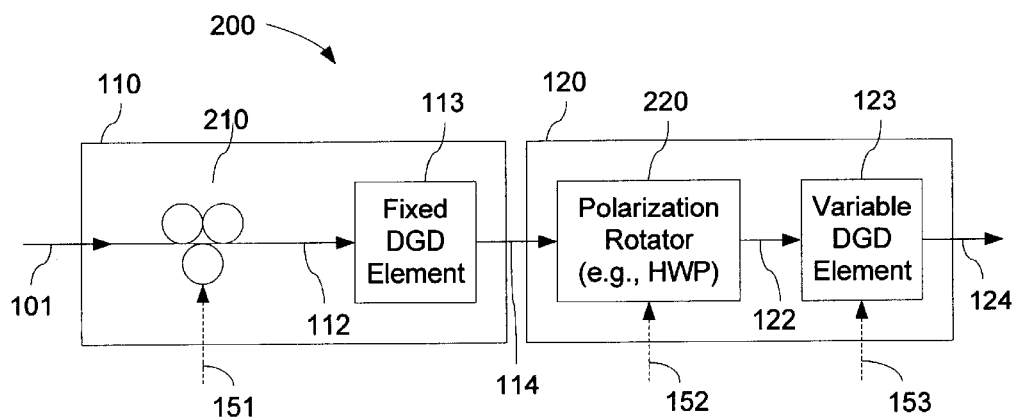
FIGS. 2, 3, and 4 show exemplary implementations of the device in FIG. 1.

In the device 100 as shown in FIG. 1, the total of 4 degrees of freedom of two polarization transformers 110 and 120 may be arranged in two different allocations. In one implementation 200 as shown in FIG. 2, the first polarization transformer 111 may be a polarization controller 210 with three degrees of freedom and the second polarization transformer 121 may simply be a polarization rotator with only one degree of freedom. The polarization controller for the transformer 111 may include at least three polarization elements optically connected in series. See, Heismann, "Analysis of a Reset-Free Polarization Controller for Fast Automatic Polarization Stabilization in Fiber-optic Transmission Systems," Journal of Lightwave Technology, Vol. 12, No. 4, April 1994. The polarization rotator for the element 121 may be implemented by a rotatable birefringent wave plate 220 with a fixed phase retardation between the two principal axes, e.g., a half-wave plate. The single control variable is the rotation of the wave plate 220 around the optic axis of the device 100. The orientation of the wave plate 220 may be continuously adjusted. The rotation may be a physical rotation of the wave plate 220 or a rotation of the principal polarization axes of the wave plate 220 without physical rotation of the plate itself. The latter may be achieved by using certain electro-optic materials (e.g., properly-cut $LiNbO_3$ crystals) controlled by an external electric field. Alternatively, the polarization rotator may be a birefringent retarder with its principal axes fixed in space. The phase retardation between the two principal axes, however, is adjustable in response to a control signal 152. This adjustable phase retarder may be formed by an electro-optic material which changes its refractive indices in response to a control electric field, a birefringent thermo-optic material engaged to a temperature control unit which changes the indices with the temperature, or a pressure-controlled birefringent material which changes the indices along two principal axes when physically squeezed (e.g., a PM fiber engaged to a piezo-electric squeezer). In another implementation, both transformers 111 and 121 may be a polarization controller with two degrees of freedom. The control operation for this implementation may be more complex than the previous implementation.

Figure 3:
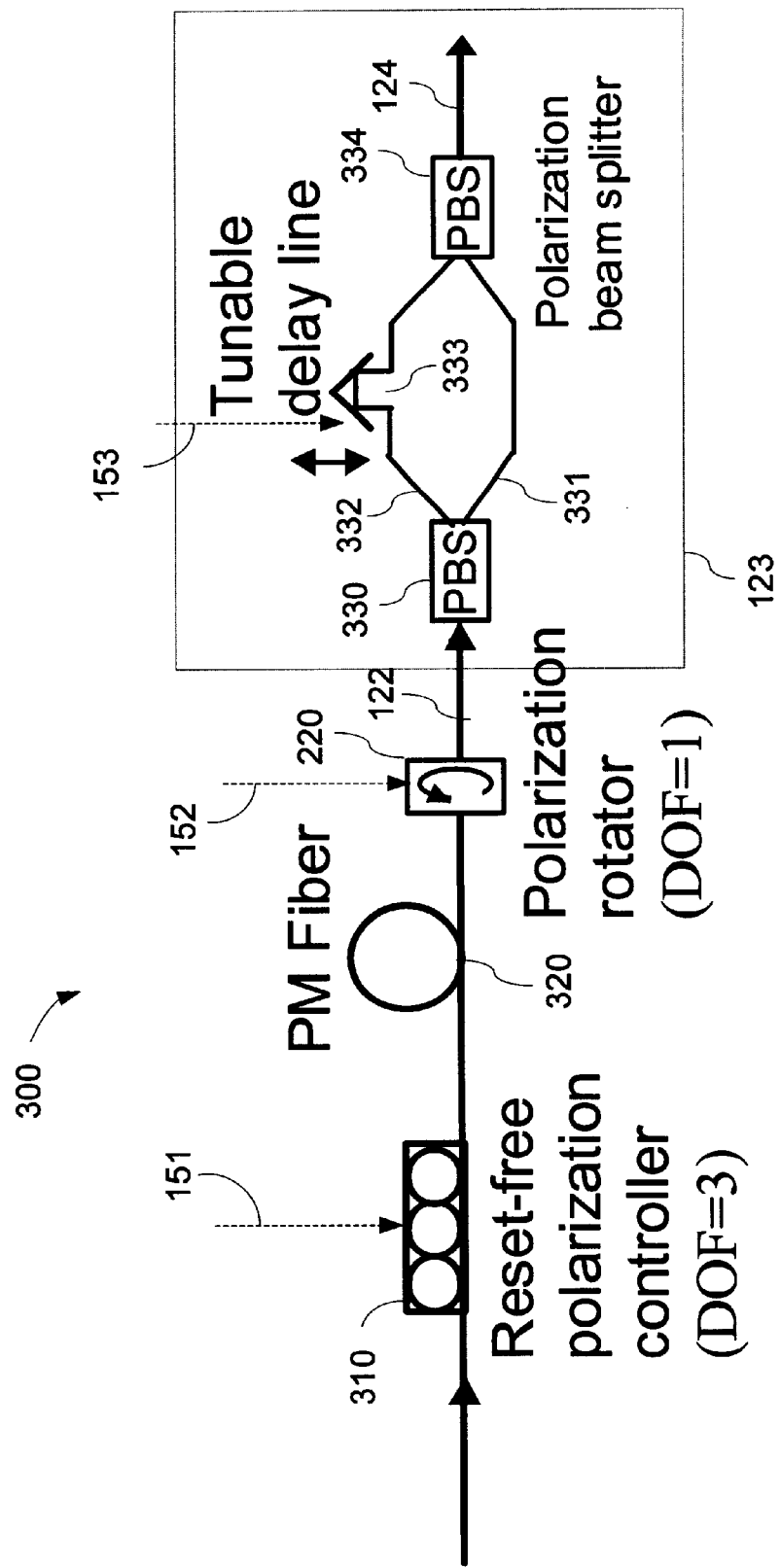

FIG. 3 shows an exemplary implementation 300 of the device 100 in FIG. 1. A reset-free polarization controller 310 with 3 degrees of freedom is used as the first polarization transformer 111 in FIG. 1. A PM fiber 320 with a selected length is used to operate as the fixed DGD element 121. The variable DGD element 123 includes two polarizing beam splitters (PBSs) 330 and 334 and two separate optical paths 331 and 332 connected therebetween. The optical signal 122 input to the element 123 is split by the first PBS 330 into two orthogonally-polarized beams respectively received by optical paths 331 and 332. The optical paths 331 and 332 are designed to have an adjustable delay relative to each other in response to the control signal 153 so that the delay between two polarizations can be varied. For example, the optical path 332 may include an adjustable portion 333 to change its total optical path length relative to that of the optical path 331. This may be achieved by either adjusting the physical length of the path 332 or a refractive index of the path 332 or both of the physical length and the index. As illustrated in FIG. 3, a retro-reflector is placed in the path 332 to change the delay by adjusting its position. The second PBS 334 combines the beams of two polarizations into a single output beam 124.

Figure 4:
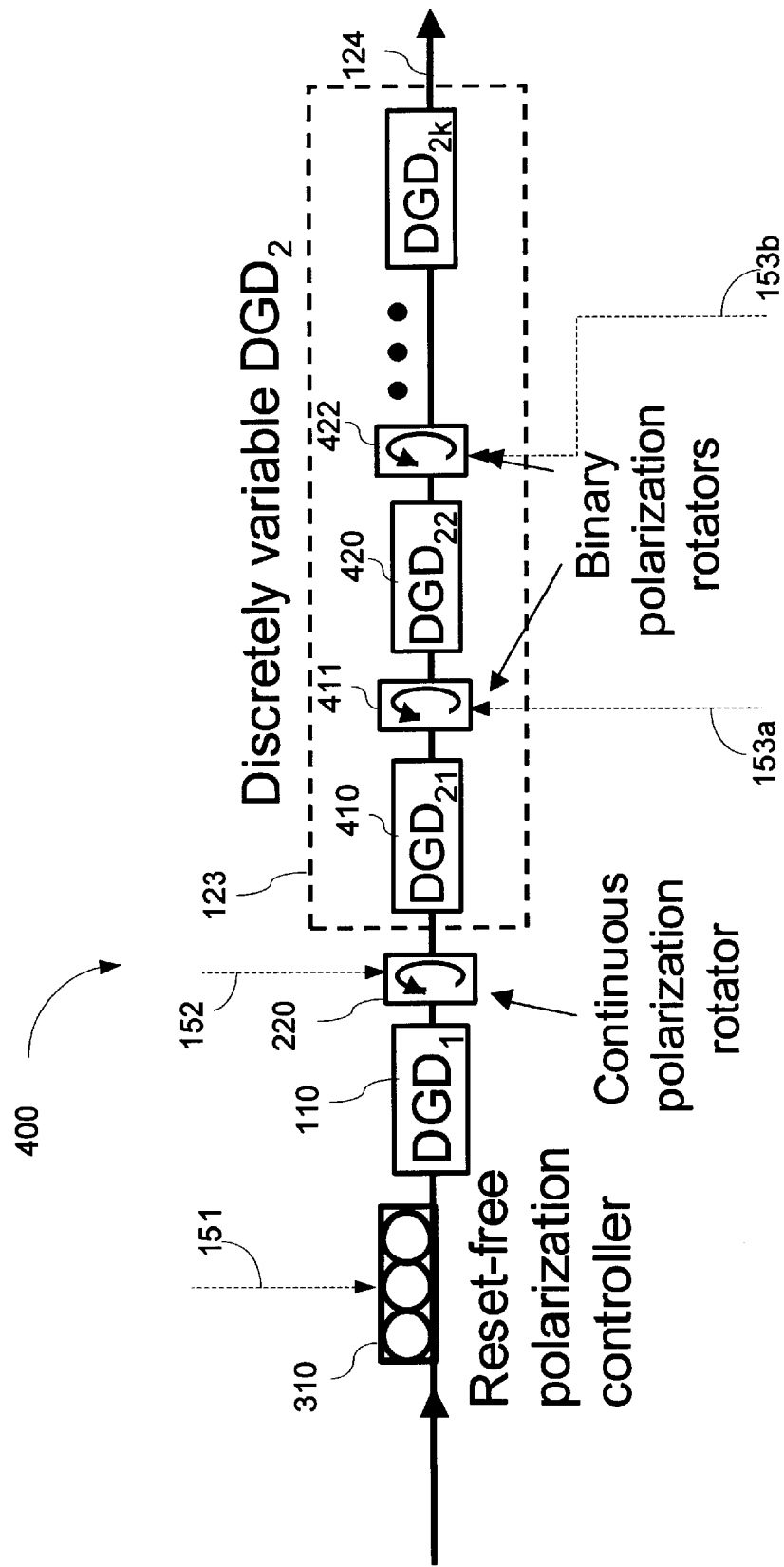

FIG. 4 shows another exemplary implementation 400 of the device 100 in FIG. 1 by using multiple fixed DGD elements 410, 420, etc. in a serial configuration to form the variable DGD element 123. A polarization rotator (e.g., 411) is placed between two adjacent fixed DGD elements (e.g., 410 and 420) to rotate the polarization of light out of a fixed DGD element relative to the principal axes of the next fixed DGD element. The allowable orientations of each polarization rotator 411 may be set at pre-selected discrete values relative to other rotators so that the total DGD of the element 123 is discrete and can be adjusted to different discrete values. Hence, the rotators 411 are controlled together and such control has only one degree of freedom. See, Sobiski et al., "Fast First-Order PMD Compensation with Low Insertion Loss for 10 Gbit/s System," Electronic Letters, Vol. 37(1), pp. 46–48.

In yet another implementation, the variable DGD element 123 may also be a nonlinearly-chirped fiber grating formed of a birefringent fiber. The overall length of the fiber grating may be controlled to produce different DGD values. See, U.S. patent application Ser. No. 09/253,645 by Cai et al. filed on Feb. 19, 1999.

Referring back to FIG. 1, a feedback control mechanism may be implemented in the above and other configurations of the device 100 in FIG. 1 to control the operations of the two stages 110 and 120 in order to produce the desired PMD in the output signal 124. The small portion of the output signal 124 may be sampled to produce a feedback signal for controlling the device 100. In one embodiment as shown in FIG. 1, an optical splitter 130, such as a fiber coupler or a beam splitter, is placed in the path of the output beam 124 to produce an output beam 131 and a feedback beam 132. An optical detector 140 is coupled to receive the feedback beam 132 and convert it into a detector signal 142. A control unit 150, coupled to the detector 150, processes the detector signal 142 to produce the control signals 151, 152, and 153 to respectively control the polarization transformers 111, 121, and the variable DGD element 123 according to the measured PMD in the output signal 124.

The PMD in the output signal 124 of the device 100 may be measured by the effects of the PMD on the signal quality. The signal quality of the signal 124 may be represented by various performance tests. One commonly used performance test is the bit error rate test that measures the bit error rate in the signal 124. An increase in the PMD can increase the bit error rate in the signal 124. Hence, the control unit 150 can control the elements 111, 121, and 123 to reduce the measured bit error rate. This test, however, requires the knowledge of the data format of the digital coding in the output signal 124 and the measurement is format specific. Another performance test is the eye opening of the eye diagram of the signal 124. One advantage of this test is that it does not depend on the digital data format of the optical signal and hence the monitoring can be achieved without any knowledge of the data format in the received signal. Based on this test, the control unit 150 controls the elements 111, 121, and 123 to increase eye opening of the eye diagram. Another format-independent performance test uses one or more polarimeter to measure the polarization state of the output signal 124 and the associated PMD. The circuits and devices for a proper performance test may be included as part of the control unit 150 or a device coupled between the control unit 150 and the optical detector 140.

However the signal quality of the signal 124 is measured, the control unit 150 is designed to use the measured signal quality to control the elements 111, 121, and 123 in order to maintain the signal quality at an acceptable level. One technical challenge is to avoid local optimization to achieve a global optimization and a short response time in controlling the elements 111, 121, and 123 by the feedback control. One feature of the present disclosure is to apply a special control operation in adjusting the elements 111, 121, and 123 in the above two-stage PMD device 100.

Figure 5:
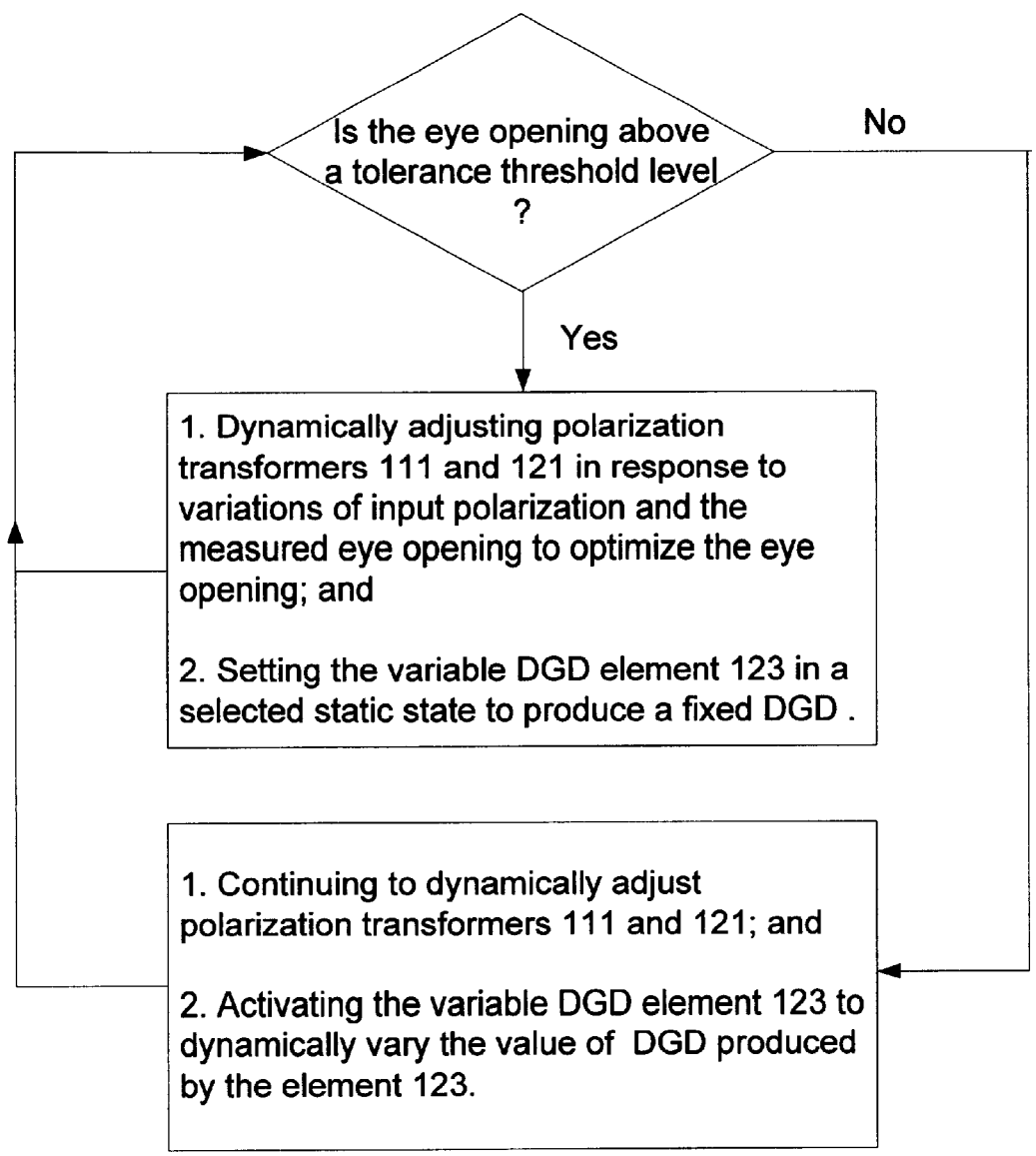
FIG. 5 shows one exemplary control algorithm for controlling the operation of the device in FIG. 1.

FIG. 5 shows a flowchart for one embodiment of this special control operation. In essence, the polarization transformers 111 and 121 are dynamically controlled during the entire operation of the device 100 in response to the measured signal quality of the signal 124. The variable DGD element 123, however, is set into either a dynamic control state or a static state depending on whether the measured signal quality is acceptable to the specific application.

In operation, when the signal degradation caused by the PMD is below a tolerance threshold level, the variable DGD element 123 in the second stage 120 may be set to a static state in which its settings are fixed to produce a fixed DGD while the polarization transformers 111 and 121 are dynamically adjusted with the input polarization. For example, the signal degradation may be monitored by measuring the opening of the eye diagram of the output signal 124 with the optical detector 140. When the opening of the eye diagram decreases below a threshold opening level, the variable DGD element 123 is activated to operate in a dynamic state in which the settings of the variable DGD element 123 are dynamically adjusted to produce a varying DGD value as a function of time to bring the signal quality back to the acceptable level. At the same time, the transformers 111 and 121 are being dynamically adjusted. This controlling of the variable DGD element 123 between the static and dynamic states during operation has shown to improve the response time of the feedback control and reduce the probability of operating the feedback loop out of its operating range.

Only a few embodiments are disclosed. However, it is understood that variations and enhancements may be made without departing from the spirit of and are intended to be encompassed by the following claims.

What is claimed is:

1. A device, comprising:
a first polarization-mode dispersion (PMD) element having an input terminal to receive an input optical signal and designed to cause a fixed differential group delay (DGD) in said input optical signal to produce a first output optical signal;
an optical element coupled to said first PMD element to receive said first output optical signal operating to rotate polarization of said first output optical signal to produce a second optical output signal; and
a second PMD element coupled to receive said second output optical signal to produce a variable DGD in response to a control signal to produce an optical output signal.

2. The device as in claim 1, wherein said second PMD element includes a nonlinearly-chirped fiber grating formed of a birefringent fiber material.

3. The device as in claim 1, wherein said second PMD element includes a first optical path to receive light of a first principal polarization of said second optical output signal, a second optical path to receive light of a second orthogonal principal polarization of said second optical output signal, and a control portion that varies an optical delay between said first and said second optical paths in response to said control signal.

4. The device as in claim 3, wherein said second PMD element further includes a first polarizing beam splitter that splits said second output signal into said first and said second optical paths and a second polarizing beam splitter that combines said first and second optical paths.

5. The device as in claim 1, wherein said second PMD element includes a plurality of fixed DGD elements and an adjustable polarization rotator optically connected between two adjacent fixed DGD elements.

6. The device as in claim 1, further comprising a polarization controller with at least two degrees of freedom connected at an input of said first PMD element, wherein said optical element has no more than two degrees of freedom.

7. The device as in claim 1, further comprising an optical detector coupled to receive a portion of said output optical signal from said second PMD element to produce a detector signal, and a control unit coupled to said optical detector to produce said control signal in response to said detector signal.

8. A device, comprising:
a first polarization-mode dispersion (PMD) element having an input terminal to receive an input optical signal and designed to cause a fixed differential group delay (DGD) in said input optical signal to produce a first output optical signal;

an optical element coupled to said first PMD element to receive said first output optical signal operating to rotate polarization of said first output optical signal to produce a second optical output signal;

a second PMD element coupled to receive said second output optical signal to produce a variable DGD in response to a control signal to produce an optical output signal; and a polarization controller with at least two degrees of freedom connected at an input of said first PMD element, wherein said optical element has no more than two degrees of freedom, wherein said polarization controller has three degrees of freedom and said optical element has one degree of freedom.

9. The device as in claim 8, wherein said optical element is an adjustable phase retarder formed of a birefringent material.

10. The device as in claim 9, wherein said phase retarder has adjustable directions of its principal polarization axes.

11. The device as in claim 9, wherein said phase retarder has adjustable indices of refraction along two principal polarization axes.

12. A device, comprising:
a first polarization-mode dispersion (PMD) element having an input terminal to receive an input optical signal and designed to cause a fixed differential group delay (DGD) in said input optical signal to produce a first output optical signal;

an optical element coupled to said first PMD element to receive said first output optical signal operating to rotate polarization of said first output optical signal to produce a second optical output signal; and a second PMD element coupled to receive said second output optical signal to produce a variable DGD in response to a control signal to produce an optical output signal, wherein said second PMD element includes a plurality of fixed DGD elements and an adjustable polarization rotator optically connected between two adjacent fixed DGD elements, and wherein said fixed DGD elements and each adjustable polarization rotator are configured to produce discrete DGD values.

13. A device, comprising:
a first polarization transformer to receive an input optical signal and responsive to a first control signal to rotate a polarization of said input optical signal to produce a first optical signal;

a first polarization-mode dispersion (PMD) element having an input terminal coupled to said first polarization transformer to receive said first optical signal and designed to cause a fixed differential group delay (DGD) in said first optical signal to produce a second optical signal;

a second polarization transformer coupled to said first PMD element to receive said second optical signal and designed to rotate a polarization of said second optical signal to produce a third optical signal under a control of a second control signal; and a second PMD element coupled to receive said third optical signal and designed to produce a variable DGD in said third optical signal in response to a third control signal to produce an optical output signal.

14. The device as in claim 13, further comprising an optical detector coupled to receive a portion of said optical output signal from said second PMD element, and a control unit coupled to said optical detector to produce said first, said second, and said third control signals in response to a detector signal.

15. The device as in claim 13, wherein said second PMD element includes a nonlinearly-chirped fiber grating formed of a birefringent fiber material.

16. The device as in claim 13, wherein said second PMD element includes a first optical path to receive light of a first principal polarization of said first optical signal, a second optical path to receive light of a second orthogonal principal polarization of said first optical signal, and a control portion that varies an optical delay between said first and said second optical paths in response to said control signal.

17. A device, comprising:
a first polarization transformer to receive an input optical signal and responsive to a first control signal to rotate a polarization of said input optical signal to produce a first optical signal;

a first polarization-mode dispersion (PMD) element having an input terminal coupled to said first polarization transformer to receive said first optical signal and designed to cause a fixed differential group delay (DGD) in said first optical signal to produce a second optical signal;

a second polarization transformer coupled to said first PMD element to receive said second optical signal and designed to rotate a polarization of said second optical signal to produce a third optical signal under a control of a second control signal;

a second PMD element coupled to receive said third optical signal and designed to produce a variable DGD in said third optical signal in response to a third control signal to produce an optical output signal; and an optical detector coupled to receive a portion of said optical output signal from said second PMD element, and a control unit coupled to said optical detector to produce said first, said second, and said third control signals in response to a detector signal, wherein said control unit is designed to control said second PMD element to produce a selected and fixed DGD when said detector signal indicates that a signal quality of said optical output signal is above a threshold and to produce a varying DGD when said detector signal indicates that said signal quality is below said threshold.

18. A device, comprising:
a first polarization transformer to receive an input optical signal and responsive to a first control signal to rotate a polarization of said input optical signal to produce a first optical signal;

a first polarization-mode dispersion (PMD) element having an input terminal coupled to said first polarization transformer to receive said first optical signal and designed to cause a fixed differential group delay (DGD) in said first optical signal to produce a second optical signal;

a second polarization transformer coupled to said first PMD element to receive said second optical signal and designed to rotate a polarization of said second optical signal to produce a third optical signal under a control of a second control signal; and a second PMD element coupled to receive said third optical signal and designed to produce a variable DGD in said third optical signal in response to a third control signal to produce an optical output signal, wherein said second PMD element includes a plurality of PMD elements optically connected in series to produce discrete variable DGD values.

19. A method, comprising:

causing a fixed differential group delay (DGD) in an optical signal to control second-order and higher-order polarization-mode dispersion (PMD) in said optical signal to produce a first intermediate signal;

causing a rotation of a polarization of said first intermediate signal to produce a second intermediate signal; and causing a second, variable DGD in said second intermediate signal in response to a control signal to control the first-order PMD without affecting the second-order and higher-order PMD.

20. A method, comprising:

causing a fixed differential group delay (DGD) in an optical signal to control second-order and higher-order polarization-mode dispersion (PMD) in said optical signal to produce a first intermediate signal;

causing a rotation of a polarization of said first intermediate signal to produce a second intermediate signal;

causing a second, variable DGD in said second intermediate signal in response to a control signal to control the first-order PMD without affecting the second-order and higher-order PMD; and causing a dynamic control over a polarization of said optical signal prior to producing said fixed DGD therein in response to a change in an input polarization of said optical signal, and wherein said second DGD is controlled at a fixed value when a signal quality of said optical signal is measured to be above an acceptable level and is varied at different values when said signal quality is below said acceptable level.

21. A method for controlling a device that includes a first adjustable polarization transformer that changes a polarization of an optical signal, a first polarization-mode dispersion (PMD) element that produces a fixed differential group delay (DGD) in an optical signal, a second adjustable polarization transformer, and a second PMD element that produces a varying DGD in an optical signal, comprising:

causing a signal quality of an optical output signal that is produced by transmitting through said device to be measured;

causing a dynamic adjustment of said first and said second polarization transformers to change polarization of light entering said first PMD element and polarization of light entering said second PMD element, respectively; and causing said second PMD element to be controlled to produce a fixed DGD value when said signal quality is measured to be above an acceptable level and to vary at different DGD values when said signal quality is below said acceptable level.

22. The method as in claim 21, wherein a bit error rate of said optical output signal is measured to determine said signal quality.

23. The method as in claim 21, wherein an opening of an eye diagram of said optical output is measured to determine said signal quality.

* * * * *